(12) United States Patent
Steinmetz et al.

(10) Patent No.: US 10,596,879 B2
(45) Date of Patent: Mar. 24, 2020

(54) SYSTEM AND METHOD FOR COOLING FAN CONTROL

(71) Applicant: ENGINEERED MACHINED PRODUCTS, INC., Escanaba, MI (US)

(72) Inventors: Todd M. Steinmetz, Escanaba, MI (US); Michael P. Lasecki, Gladstone, MI (US)

(73) Assignee: Engineered Machined Products, Inc., Escanaba, MI (US)

( * ) Notice: Subject to any disclaimer, the term of this patent is extended or adjusted under 35 U.S.C. 154(b) by 475 days.

(21) Appl. No.: 15/235,618

(22) Filed: Aug. 12, 2016

(65) Prior Publication Data

US 2018/0043751 A1 Feb. 15, 2018

(51) Int. Cl.
| F01P 7/00 | (2006.01) |
| B60H 1/32 | (2006.01) |
| F01P 7/16 | (2006.01) |
| F01P 7/02 | (2006.01) |
| F01P 5/02 | (2006.01) |

(52) U.S. Cl.
CPC ............ *B60H 1/3227* (2013.01); *F01P 7/026* (2013.01); *F01P 7/165* (2013.01); *B60H 2001/3282* (2013.01); *F01P 2005/025* (2013.01)

(58) Field of Classification Search
CPC .......... F01P 3/18; F01P 2003/182; F01P 5/02; F01P 2005/025; F01P 7/04; F01P 7/048; B60H 1/3227; B60H 2001/3282
See application file for complete search history.

(56) References Cited

U.S. PATENT DOCUMENTS

| 5,415,134 | A | 5/1995 | Stewart, Jr. | |
| 6,463,891 | B2 * | 10/2002 | Algrain | F01P 3/18 123/41.12 |
| 6,591,174 | B2 | 7/2003 | Chung et al. | |
| 7,267,085 | B2 | 9/2007 | Joyce et al. | |
| 7,267,086 | B2 | 9/2007 | Allen et al. | |
| 7,347,168 | B2 | 3/2008 | Reckels et al. | |
| 7,406,835 | B2 | 8/2008 | Allen et al. | |
| 7,424,868 | B2 | 9/2008 | Reckels et al. | |
| 7,454,896 | B2 | 11/2008 | Chalgren et al. | |
| 7,484,378 | B2 | 2/2009 | Allen et al. | |
| 7,533,635 | B2 | 5/2009 | Bradley et al. | |
| 8,646,264 | B2 | 2/2014 | Rampen et al. | |
| 2005/0005620 | A1 * | 1/2005 | Oda | B60H 1/00828 62/183 |

(Continued)

FOREIGN PATENT DOCUMENTS

WO   2015088423 A1   6/2015

*Primary Examiner* — Eric S Ruppert
(74) *Attorney, Agent, or Firm* — Brooks Kushman P.C.

(57) ABSTRACT

A plurality of fans is connectable to a heat exchanger arrangement having a plurality of separated cooling loops. At least one of the fans is operable to move air through at least two of the cooling loops, and at least one other fan is operable to move air through at least one of the cooling loops. A control system includes at least one controller and is operable to control each of the at least one fan using a respective control strategy correlating temperature values with fan outputs, and to control each of the at least one other fan using a respective control strategy that is different from each control strategy used to control the at least one fan.

22 Claims, 9 Drawing Sheets

(56) References Cited

U.S. PATENT DOCUMENTS

| | | | |
|---|---|---|---|
| 2006/0191500 A1* | 8/2006 | Sugiyama | F01P 7/048 123/41.12 |
| 2014/0312128 A1 | 10/2014 | Matsuoka et al. | |
| 2016/0061093 A1 | 3/2016 | Johansson et al. | |

* cited by examiner

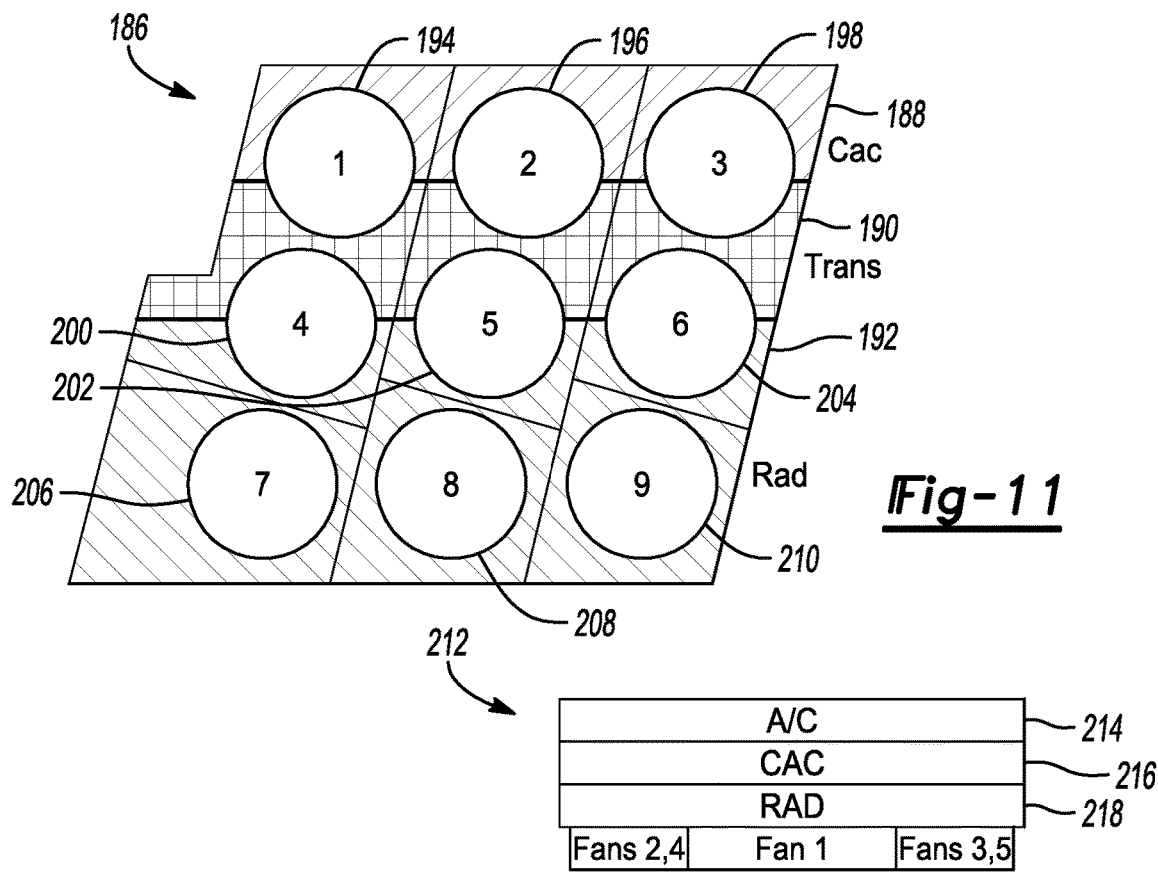
*Fig-11*
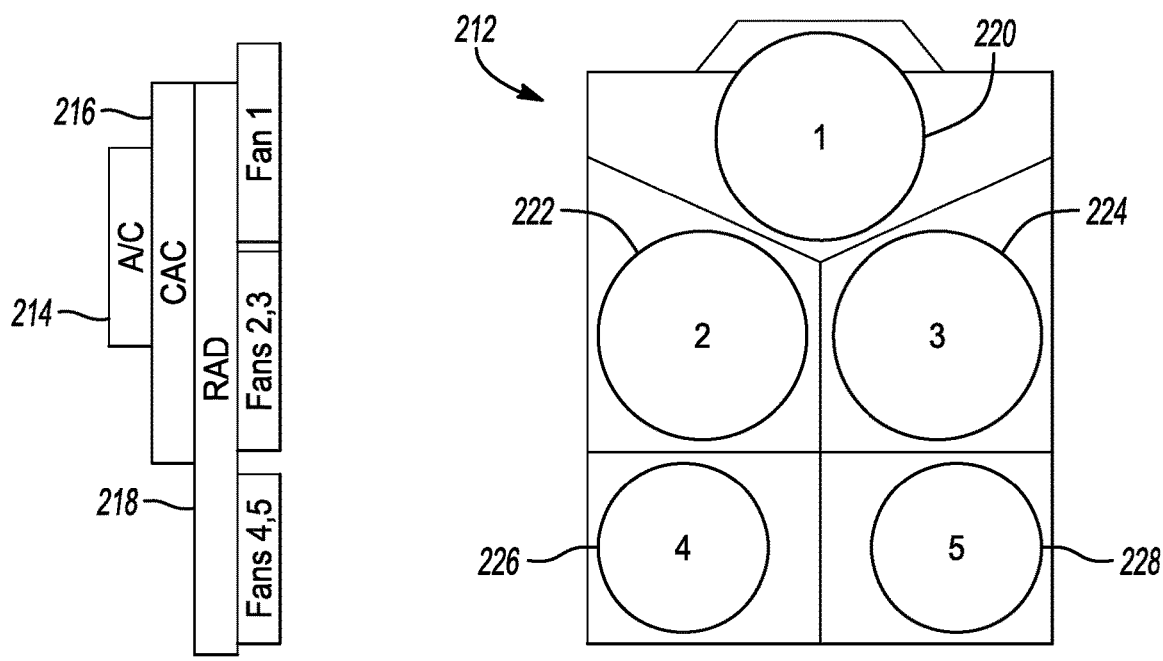
*Fig-12B*
*Fig-12C*
*Fig-12A*

US 10,596,879 B2

SYSTEM AND METHOD FOR COOLING FAN CONTROL

TECHNICAL FIELD

The present disclosure relates to a system and method for cooling fan control.

BACKGROUND

Typical cooling systems for vehicles, especially large vehicles, may not always provide an optimal amount of cooling for all of the various heat-producing devices within the vehicle. For example, a large vehicle may have cooling requirements for an engine, a traction motor, a transmission, an air-conditioning system, and charge air system, just to name a few. In some cases, cooling systems include heat exchanger arrangements having one or more heat exchangers adjacent to each other or arranged in a front-to-back configuration. In such a case, a single fan may operate to cool more than one portion of the heat exchanger arrangement—e.g., a single fan may operate to move air through a radiator to cool an engine and a charge air cooler to cool intake air coming into the engine. Because different heat-producing devices within a vehicle may have different cooling needs at any given time, it may be difficult to provide the desired level of cooling for each device, especially when the cooling system includes a shared heat exchanger arrangement. Therefore, it would be desirable to have a system and method for controlling cooling fans that provides a desired level of thermal management for a number of heat-producing devices within a vehicle.

SUMMARY

Embodiments described herein may include a thermal management system for a vehicle that includes first and second fans connectable to a heat exchanger arrangement having a plurality of separated cooling loops therein such that the first fan is operable to move air through at least two of the cooling loops, and the second fan is operable to move air through at least one of the cooling loops. The at least one of the cooling loops is different from the at least two of the cooling loops. The heat exchanger arrangement is connectable to a heat-producing system of the vehicle, and the heat exchanger arrangement and the fans form a part of a cooling system for the heat-producing system. A control system includes at least one controller and is operable to control the fans. The control system is configured to control the first fan at least in part according to temperature values correlated with a first set of fan outputs, and to control the second fan at least in part according to the temperature values correlated with a second set of fan outputs. At least some of the second set of fan outputs is higher than the first set of fan outputs at the same respective temperature values. The temperature values are based on a temperature parameter indicative of one of a temperature of the heat-producing system or a temperature of the cooling system.

Embodiments described herein may include a thermal management system for a vehicle that includes a plurality of fans connectable to a heat exchanger arrangement having a plurality of separated cooling loops therein such that at least one fan of the fans is operable to move air through at least two of the cooling loops, and at least one other fan of the fans is operable to move air through at least one of the cooling loops. The at least one of the cooling loops is different from the at least two of the cooling loops. The heat exchanger arrangement is connectable to a heat-producing system of the vehicle, and the heat exchanger arrangement and the fans form a part of a cooling system for the heat-producing system. A control system includes at least one controller and is operable to control each of the at least one fan using a respective control strategy correlating temperature values with fan outputs, and to control each of the at least one other fan using a respective control strategy that is different from each control strategy used to control the at least one fan.

Embodiments described herein may include a method of thermal management for a vehicle having a heat-producing system and a cooling system operatively connected thereto and including first and second fans connectable to a heat exchanger arrangement having a plurality of separated cooling loops therein such that the first fan is operable to move air through at least two of the cooling loops, and the second fan is operable to move air through at least one of the cooling loops. The at least one of the cooling loops is different from the at least two of the cooling loops. The method may include the steps of operating the first fan at least in part according to temperature values correlated with a first set of fan outputs, and operating the second fan at least in part according to the temperature values correlated with a second set of fan outputs. At least some of the second set of fan outputs are higher than the first set of fan outputs at the same respective temperature values. The temperature values are based on a temperature parameter indicative of one of a temperature of the heat-producing system or a temperature of the cooling system.

BRIEF DESCRIPTION OF THE DRAWINGS

FIG. 11 shows a fan and heat exchanger arrangement with separate heat exchanger portions for a charge air cooler, a transmission, and a radiator; and FIGS. 12A-12C show different views of a fan and heat exchanger arrangement where the heat exchangers are arranged in a front-to-back configuration.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
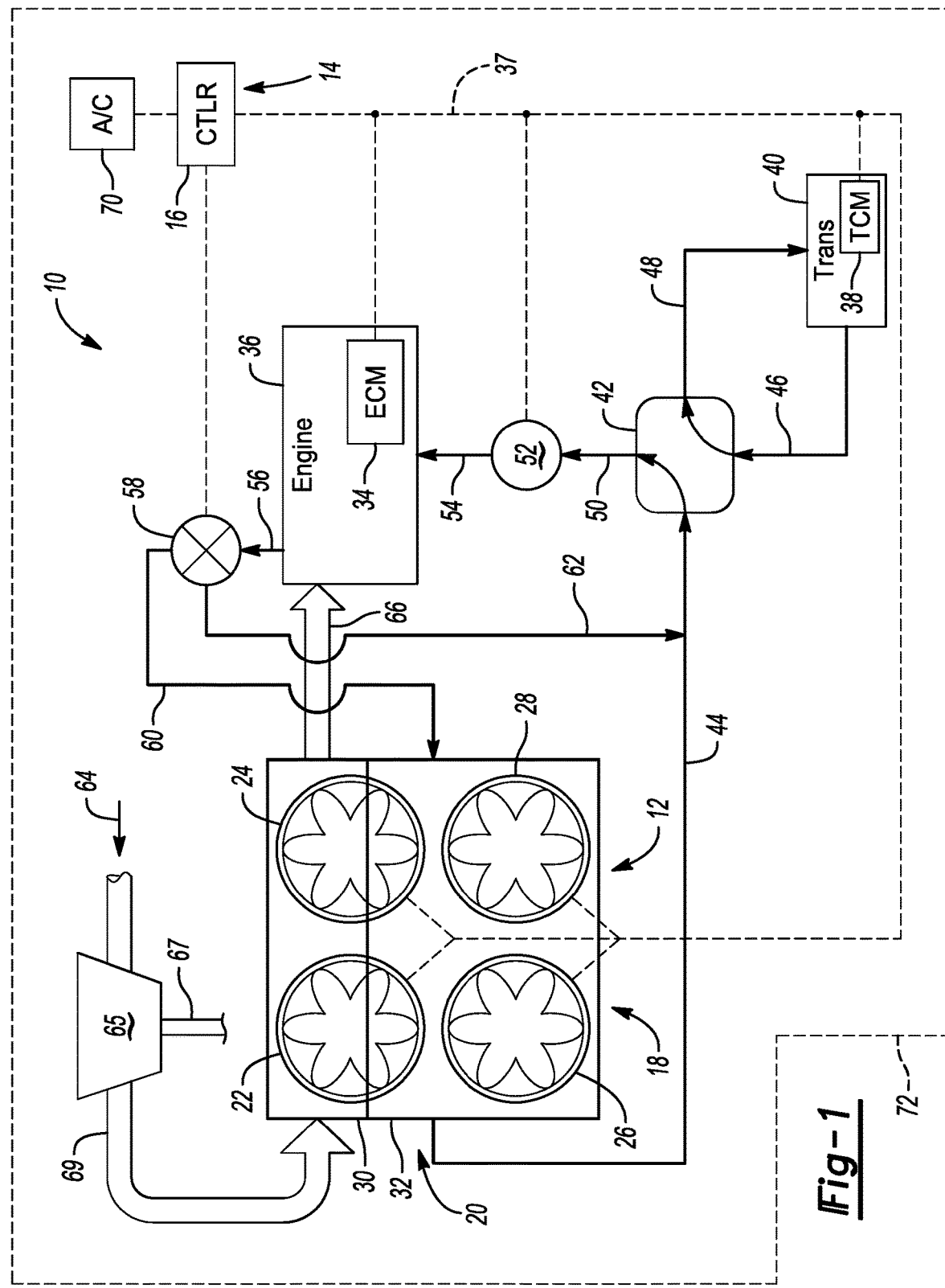
FIG. 1 is a schematic drawing of a thermal management system for a vehicle in accordance with embodiments described herein.

FIG. 1 shows a thermal management system 10 for a vehicle, and in particular a system for cooling fan control, in accordance with embodiments described herein. Although systems and methods described herein may be conveniently used with passenger and commercial automotive vehicles, it is contemplated that they may be used with other types of vehicles as well—e.g., locomotives, airliners, and marine vehicles just to name a few. The thermal management system 10 includes a cooling system 12 and a control system 14, which includes a cooling system controller 16. The cooling system 12 includes a heat exchanger and fan arrangement 18, which has a heat exchanger unit 20 and fans 22, 24, 26, 28. The heat exchanger unit 20 is made up of two separate heat exchange portions: a first heat exchange portion 30, which is part of a charge air cooling system, and a second heat exchange portion 32, which is configured to cool engine coolant—i.e., a radiator. In addition to the cooling system controller 16, the control system 14 includes an engine control module 34 (ECM), which is configured to control an engine 36 and communicate with other controllers on a communications link 37. The control system 14 also includes a transmission control module 38 (TCM), which is configured to control a transmission 40 and communicate with other controllers on the communications link 37.

The cooling system 12 also includes an auxiliary heat exchanger 42, which receives coolant through a coolant line 44 and transmission oil through a transmission oil line 46, and exchanges heat between the two mediums. The transmission oil is output from the heat exchanger 42 through another transmission oil line 48 where it returns to the transmission 40. The engine coolant is output from the heat exchanger 42 through another coolant line 50, which provides an intake for a pump 52. As shown in FIG. 1, the pump 52 is also connected to the communications link 37, so that it can be controlled and communicate with the control system 14. The coolant is output from the pump 52 through a coolant line 54 and into the engine 36—i.e., the coolant is pumped through a water jacket on the engine 36. The coolant is output from the engine 36 through a coolant line 56, which provides an intake for a bypass valve 58.

As shown in FIG. 1, the bypass valve 58 can be controlled to output some or all of the coolant through a coolant line 60, which leads directly into the radiator portion 32 of the heat exchanger arrangement 20. Alternatively, the bypass valve 58 can output some or all of the coolant through a bypass line 62, which bypasses the radiator 32. The bypass valve 58 can be controlled by the control system 14 based on any number of factors, including whether the engine 36 or transmission 40 is at a desired temperature. As shown in FIG. 1, the fans 22, 24 each extend over a portion of the charge air cooler 30 and a portion of the radiator 32. In contrast, the lower fans 26, 28 extend over the radiator portion 32 only. Each of the fans 22, 24, 26, 28 is connected to the communications link 37 and can be controlled by the control system 14.

Because of the difference in heat exchanger coverage, it may be desirable to control the fans 22, 24 separately from the fans 26, 28. The control system 14 may provide a reactive-type control, wherein the cooling system 12 is controlled based on current thermal properties of the heat-producing devices—e.g., engine coolant temperature, charge air temperature, etc. In addition or alternatively, the control system 14 may provide a predictive-type control, wherein the cooling system 12 is controlled based on predicted future heat loads of the various heat-producing devices. A control system and method for this type of control is described, for example, in copending U.S. patent application entitled Thermal Management System and Method for a Vehicle, filed on Aug. 12, 2016 and having Ser. No. 15/235,526, which is incorporated by reference herein.

FIG. 1 also shows fresh air 64 entering a compressor 65, which may be a part of a turbo charger for the vehicle. The compressor 65 is driven by a shaft 67 connected to a turbine (not shown), which may, for example, be driven by exhaust gas leaving the engine 36. On the output side of the turbine 65, an air line 69 carries boosted, clean air to the charge air cooler 30. The air exits the charge air cooler 30 through an intake line 66, which provides intake air to an intake manifold (not shown), where it may be mixed with recirculated engine exhaust gas. As shown in FIG. 1, the heat exchanger arrangement 20 includes two cooling loops that are separated from each other. The first cooling loop is the one that cools the engine and a transmission through a liquid-to-air heat exchange and includes the engine coolant, the radiator 32, the auxiliary heat exchanger 42, the pump 52, the engine 36, and the valve 58. The second cooling loop is the one that cools the charge air and includes the fresh air 64, the compressor 65, the charge air cooler 30, and the engine 36.

In the embodiment shown in FIG. 1, the cooling system 12 includes the heat exchanger and fan arrangement 18, the auxiliary heat exchanger 42, the pump 52, the bypass valve 58, and the various coolant and air lines associated with the system. In other embodiments, a cooling system may include only one or more cooling fans that can be controlled by a control system, like the control system 14. A cooling system may include only fans that can be connected to other elements of a larger cooling system such as the one shown in FIG. 1. In other embodiments, a cooling system may include only a fan or fans that are connected to a heat exchanger, such as the heat exchanger arrangement 20—e.g., the heat exchanger and fan arrangement 18. A fan and heat exchanger arrangement such as this could then be connected to various other components of a larger cooling system, such as the cooling lines and other heat exchangers as shown in FIG. 1.

In general, the cooling system 12 is controlled by the control system 14, which is configured to control thermal management for a heat-producing system, such as a component or components of a vehicle. In the embodiment shown in FIG. 1, the heat-producing system includes two heat-producing devices—i.e., the engine 36 and the transmission 40. The transmission 40 may be particularly prone to generating large amounts of heat if it includes a retarder of the type used in large commercial vehicles, such as buses, to help reduce a speed of the vehicle without relying entirely on the friction brakes. In other embodiments, a heat-producing system may include a single heat-producing device, or more than two heat-producing devices.

Another heat producing device forming a part of a heat-producing system in the vehicle may be an air conditioning system (A/C) 70, which, in the embodiment shown in FIG. 1, is in communication with the cooling system controller 16. Air conditioning condensers transfer heat out of an A/C system, and as explained in conjunction with FIG. 12, an A/C condenser may be a part of a heat exchanger arrangement and its heat transfer requirements managed at least in part by one or more fans that are controlled by a control system, such as the control system 14. Although not a device, another area of a heat-producing system requiring thermal management may be an engine compartment, such as engine compartment 72 illustrated in FIG. 1. As explained in more detail below, air generated by one or more of the fans 22, 24, 26, 28 may circulate air through the engine compartment 72 for a number of reasons, for example, when a temperature of the engine compartment 72 gets too high, the air may be circulated through the engine compartment 72 in order to cool it. The cooling system 12 has a variable cooling capacity, which may be controlled, for example, through operation of various cooling devices within the system—e.g., the fans 22, 24, 26, 28, the pump 52, the valve 58, or some combination of these. One or more of these cooling devices may individually have variable cooling capacities—i.e., variable speed in the case of the fans 22, 24, 26, 28 and pump 52, and variable flow rates in the case of the valve 58.

Figure 2:
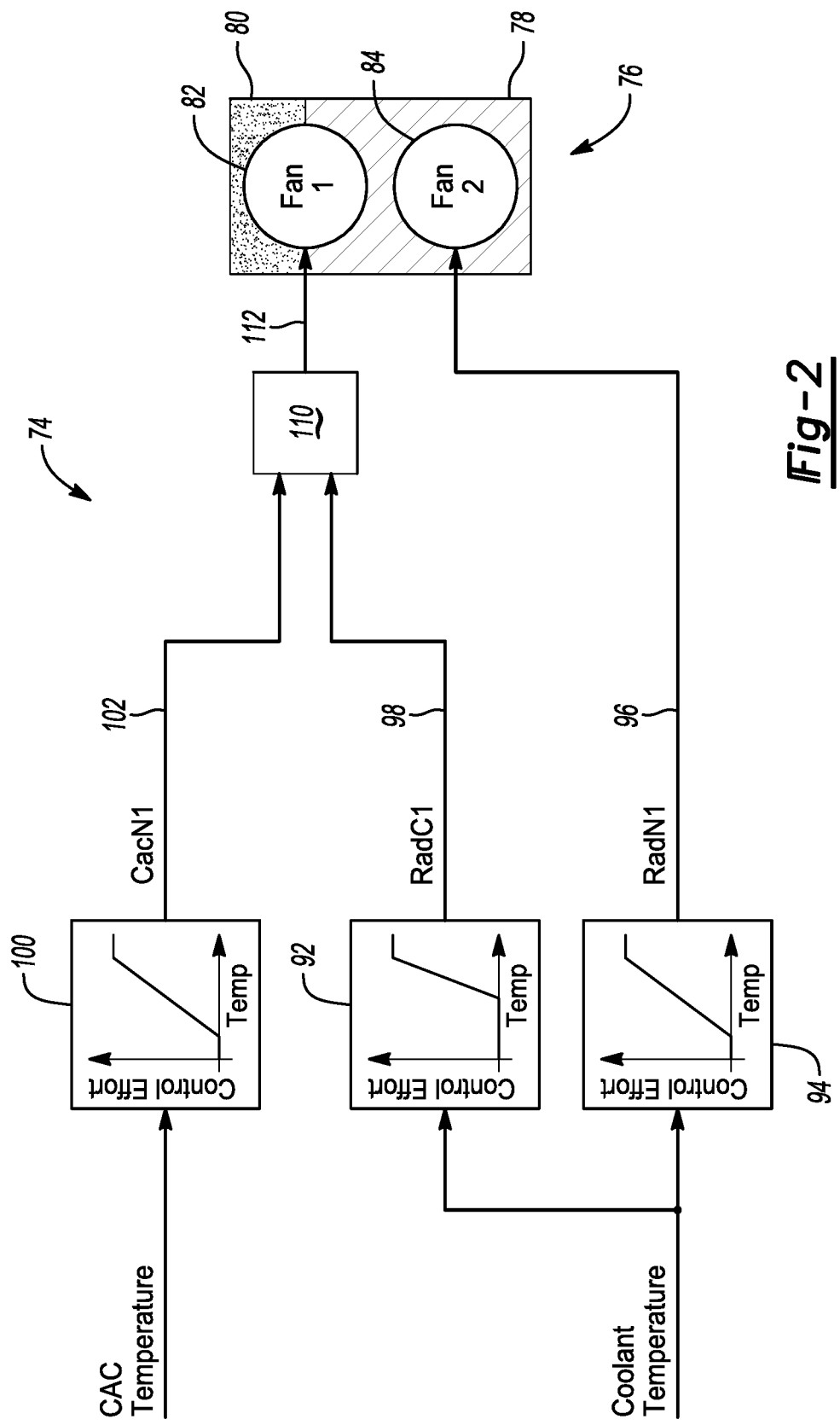
FIG. 2 is a flowchart illustrating a system and method for cooling fan control that includes thermal management of a radiator and a charge air cooler in accordance with embodiments described herein.

FIG. 2 shows a flowchart 74 illustrating a system and method for cooling fan control in accordance with embodiments described herein. A heat exchanger arrangement 76 includes two heat exchangers: a radiator 78 and a charge air cooler 80. Similar to the heat exchanger arrangement 20 shown in FIG. 1, each of these heat exchangers 78, 80 is part of two separated cooling loops. A first of the cooling loops includes the charge air cooler 80, and a second of the cooling loops includes the radiator 78—see, also, the first and second cooling loops illustrated and described in conjunction with FIG. 1. As shown in FIG. 2, a first fan 82 is operable to move air through both cooling loops—i.e., it moves air through both the charge air cooler 80 and the radiator 78. And a second fan 84 is operable to move air through only one of the cooling loops—i.e., it moves air through the radiator 78 only. Therefore, even though there is an overlap with the first fan 82 servicing both cooling loops, the first and second fans 82, 84 do not service exactly the same cooling loops.

Because the first and second fans 82, 84 do not service the same cooling loops, it may be desirable to operate them independently of one another so that the requirements of one cooling loop are not imposed on the other cooling loop, which could result in an under- or over-cooling. Although the example illustrated and described in conjunction with FIG. 2—and later with FIGS. 5 and 6—includes only two fans, it is understood that the systems and methods described herein may be expanded to more than two fans, such as the four-fan arrangement shown in FIG. 1. FIGS. 11 and 12 also illustrate larger fan arrangements and are described in more detail below. Similar to the heat exchanger arrangement 20 shown in FIG. 1, the heat exchanger arrangement 76 is connectable to a heat-producing system of a vehicle. For example, the radiator 78 may be connected to an engine, a transmission, or both—see, e.g., the engine 36 and the transmission 40 in FIG. 1. Similarly, the charge air cooler 80 may be connected to a charge air system, such as the fresh air intake 64 and the compressor 65 also shown in FIG. 1.

FIG. 2 shows a control schematic for the first and second fans 82, 84, which may be preprogrammed into a control system, such as the control system 14. With reference to the schematic diagram shown in FIG. 1, the control system may be more particularly programmed into the cooling system controller 16. For operation of the first fan 82, the control system may be configured to control it at least in part according to temperature values correlated with a first set of fan outputs, where the temperature values are based on a temperature parameter indicative of one of a temperature of the heat-producing system or a temperature of the cooling system. More specifically, the temperature parameter could be, for example, a temperature of the engine coolant, a temperature of the charge air, a temperature of a sump in a transmission, such as the transmission 40 shown in FIG. 1, a transmission retarder temperature—which may be indicated by a temperature of a transmission oil outlet—or a temperature of an engine compartment, such as the engine compartment 72 shown in FIG. 1. The temperature values mentioned above are the actual temperature readings or estimates of the temperature parameter being used. For example, if engine coolant is the temperature parameter, then the values might be various engine coolant temperatures over a relevant temperature range for controlling the thermal management of a heat-producing system.

In the embodiment shown in FIG. 2, the second fan is also controlled at least in part according to the same temperature values correlated with a second set of fan outputs, where at least some of the second set of fan outputs are higher than the first set of fan outputs at the same respective temperature values. As used herein, "a set" of fan outputs does not require a limited range of values with discrete starting and ending points; rather, a set may be a group of fan outputs that are associated with various values of temperature, and the set may not have a particular starting or ending value. The correlation between various temperature values and fan outputs is graphically illustrated in FIG. 3, which shows a graph 86 illustrating a relationship between engine coolant temperature along the x-axis and a set of fan outputs along the y-axis. The fan outputs are normalized values that allow a control system, such as the control system 14, to control fans of different sizes and flow rate capacities to be operated according to a common control effort. This simplifies the control system, especially when there are many fans on a large heat exchanger arrangement and they have a wide disparity in size and maximum output.

The graph 86 shows two curves 88, 90 that respectively show the first and second sets of fan outputs over various temperature values of the temperature parameter—which is the engine coolant temperature. Each of the curves 88, 90 has an unlabeled dotted line associated with it. These represent a hysteresis for defining the relationship between the temperature values and the fan output levels when the temperature values are decreasing. Returning to FIG. 2, it is shown that a value of the temperature parameter—i.e., a measured or estimated temperature of the engine coolant—is input into two control blocks 92, 94. This may be, for example, the current temperature of the engine coolant as measured or estimated and provided to the control system through various sensors connected to the communications network 37—see FIG. 1.

Figure 3:
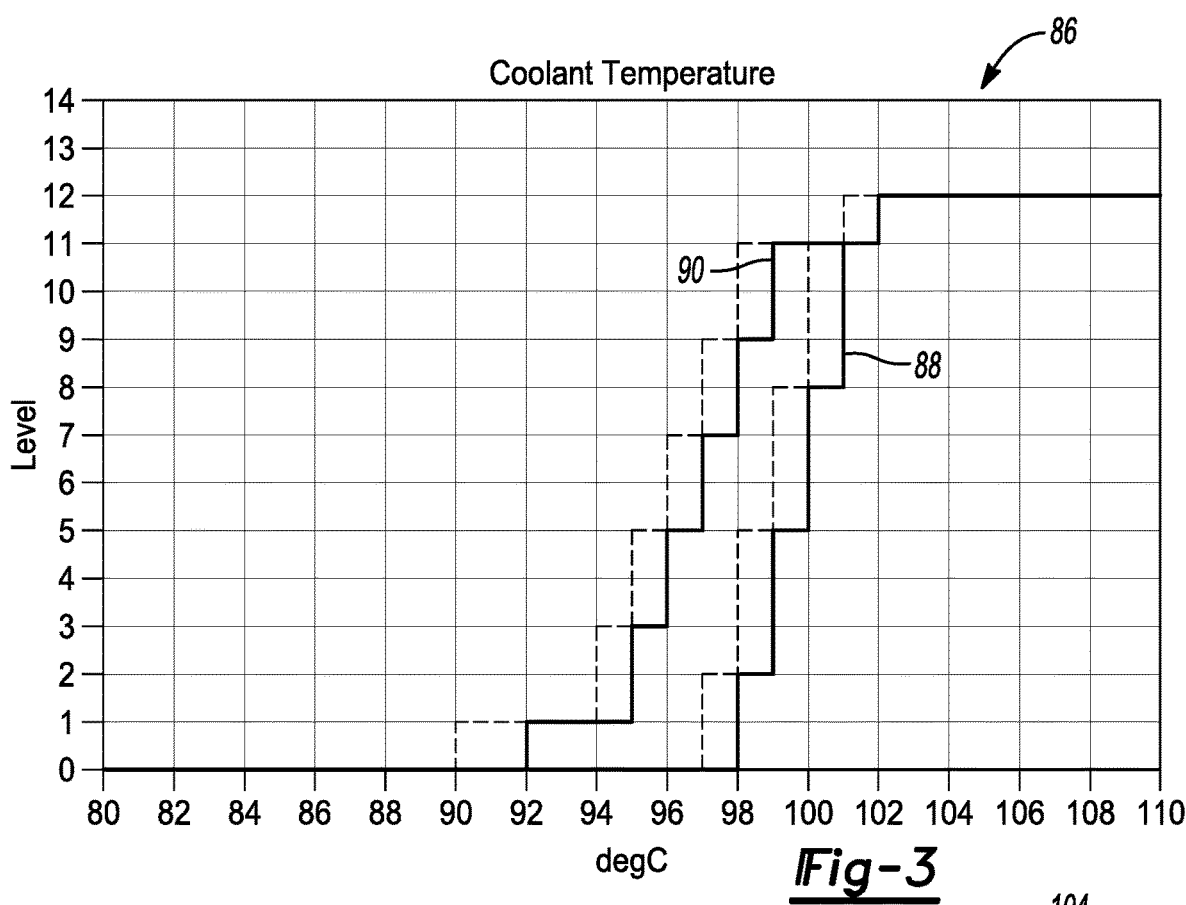
FIG. 3 is a graph illustrating a relationship between coolant temperature and fan output for two different operating curves.

The first control block 92 is configured to control fan 1 at least in part based on the curve 88 shown in FIG. 3. Although the relationships between the temperature values and the fan outputs are illustrated in the form of curves 88, 90, as used herein, a "curve" includes other forms of representing these relationships, which may be programmed into the control system in the form of an equation, a lookup table, a PID control algorithm, or any other method effective to allow the control system to operate the fans as desired. In addition, even though the curves 88, 90 are shown as step-functions—which may be convenient for implementation of a system based on discrete temperature measurements and discrete levels of fan output—embodiments described herein contemplate the use of continuous functions such as may be expressed in a first order linear, or second order or higher, polynomial equation.

In the embodiment shown in FIG. 2, an output 96, labeled as "RadN1", is used to control the second fan 84. The control block 94 provides the output 96 based on the second curve 90 shown in FIG. 3. If, for example, the coolant temperature being input into the control block 94 was 96.5 C, the control signal 96 would provide for operation of the second fan 84 at level 5. If, however, the coolant temperature were just one half of a degree higher at 97 C, the graph 90 indicates that the control signal 96 should provide for operation of the second fan 84 at level 7. In other embodiments, the output 96 may not be the exclusive control signal used to control the fan 84. This is the case with regard to the first fan 82, which uses a control signal 98, labeled as "RadC1", in conjunction with another control signal to control the first fan 82.

The control block 92 provides the output 98 based on the first curve 88, rather than the second curve 90. This is because the first fan 82 is shared between the radiator 78 and the charge air cooler 80, and operating the first fan 82 based solely on the needs of the radiator 78 may lead to an over-cooling of the charge air cooler 80. As shown in FIG. 3, at least some of the fan outputs for the second curve 90 are higher than the set of fan outputs for the first curve 88 at the same respective temperature values. For example, at 98.5 C, the first set of fan outputs—as indicated by the first curve 88—provides for a fan output at level 2. In contrast, at the same 98.5 C temperature, the second set of fan outputs—as indicated by the second curve 90—provides for a fan output at level 9. As shown in FIG. 3, only at very low and very high temperatures are the fan outputs the same for both curves 88, 90.

As described above, the first fan 82 is not operated exclusively based on the control block 92; rather, another control block 100 provides an output signal 102—labeled "CacN1"—which may be used in conjunction with the control signal 98 to control the first fan 82. The control block 100 uses a second temperature parameter that is different from the first temperature parameter—i.e., the control block 100 uses a temperature of the charge air cooler 80 as a temperature parameter rather than a temperature of the engine coolant, which is used by the control blocks 92, 94. The temperature of the charge air cooler may be determined by measuring or estimating the temperature of the air in the charge air cooler system at some convenient point—see, e.g., the air intake 66 shown in FIG. 1. The control block 100, which again may be part of a control system such as the control system 14 shown in FIG. 1, uses second temperature values correlated with a third set of fan outputs to provide the control signal 102.

Figure 4:
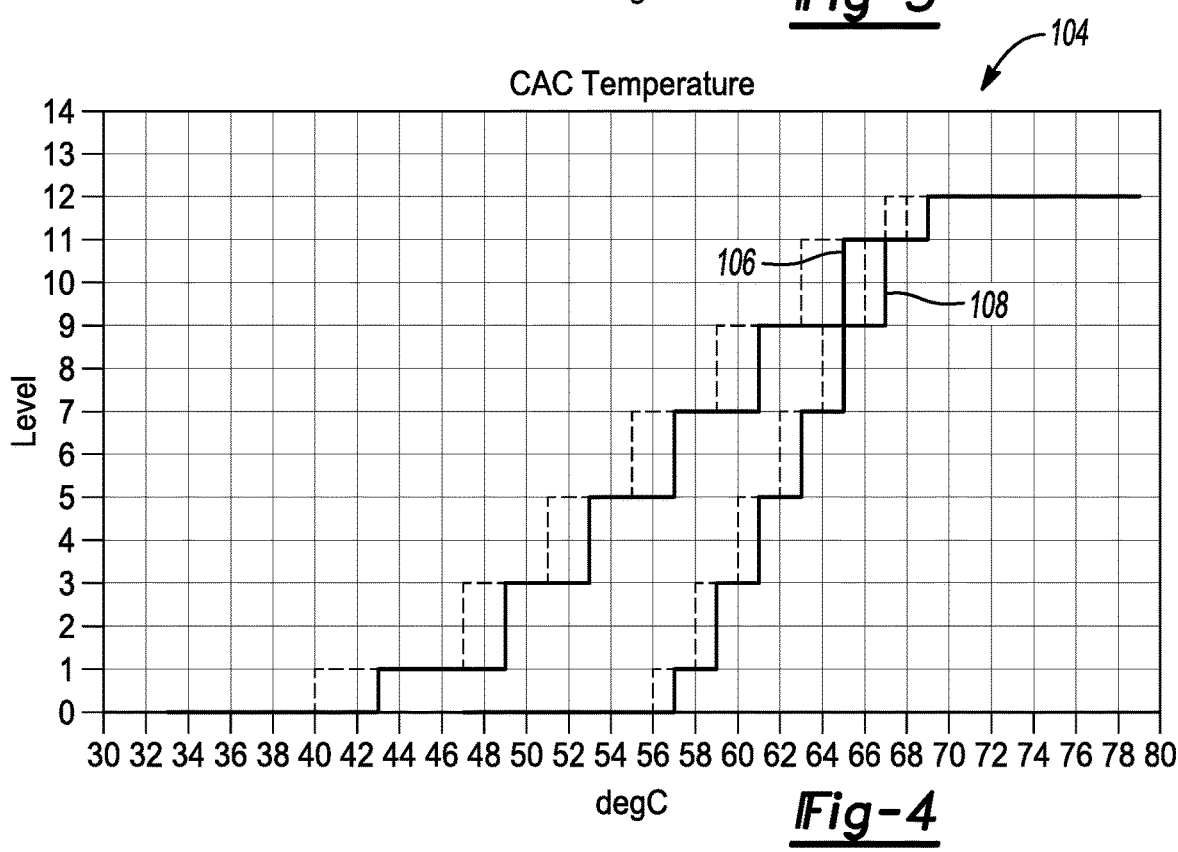
FIG. 4 is a graph illustrating a relationship between charge air temperature and fan output for two different operating curves.

Turning to FIG. 4, a graph 104 is shown with two curves 106, 108. The curve 106 correlates the second set of temperature values—i.e. the charge air temperature values shown along the x-axis—with a third set of fan outputs, which are the normalized fan levels shown along the y-axis of the graph 104. Similarly, the curve 108 correlates the second set of temperature values with a fourth set of fan outputs. Similar to the graph 86 shown in FIG. 3, the unlabeled dotted lines associated with the curves 106, 108 in the graph 104 represent a hysteresis path for fan levels used when the charge air temperature is decreasing. The control block 100 uses the relationship expressed by the curve 106 to provide the control signal 102. The control signal 102 from the control block 100 and the control signal 98 from the control block 92 are evaluated by a comparator 110 shown in FIG. 2.

In at least some embodiments, the comparator 110 may arbitrate the signals 98, 102 to find the maximum fan output indicated by the two signals 98, 102. In other embodiments, the comparator 110 may combine the fan output levels indicated by the signals 98, 102 according to some different instruction set so that the highest value is not the final output. Regardless of how the arbitration is configured, the comparator 110 outputs a control signal 112 to the first fan 82 so that it can be operated at the desired level. In general, a first control strategy was used to control the first fan 82 shown in FIG. 2, while a second control strategy different from the first control strategy was used to control the second fan 84. More specifically, the first control strategy was configured to control the first fan 82 based in part on a first engine coolant temperature curve 88 and on a first charge air temperature curve 106. In contrast, the second control strategy was configured to control the second fan 84 based on a second engine coolant temperature curve 90.

As described above, embodiments of systems and methods described herein may use different curves or different relationships between temperature values and fan output, and even different sets of temperature values for different temperature parameters and fan output, to control cooling fans to achieve a desired operating temperature for various heat-producing devices in a vehicle. One reason for this was also described above, and that is a desire to control cooling for different cooling loops so that each of the cooling loops is maintained at or near its desired temperature, even if one or more fans are shared between the different cooling loops. Another reason that different operating curves and different control strategies may be applied to the cooling fans is to address special operating modes. For example, when a very large vehicle such as a bus is operated below a certain speed, the sound generated by the cooling fans may be greater than the sound generated by the engine. This may be particularly true when the vehicle is completely stopped and is idling. In such a case, it may be desirable to operate the fans at a lower speed so as to reduce the noise output from the vehicle. Of course, the cooling requirements of the various heat-producing devices still need to be met, but the control strategies may be modified to address both of these competing interests.

Figure 5:
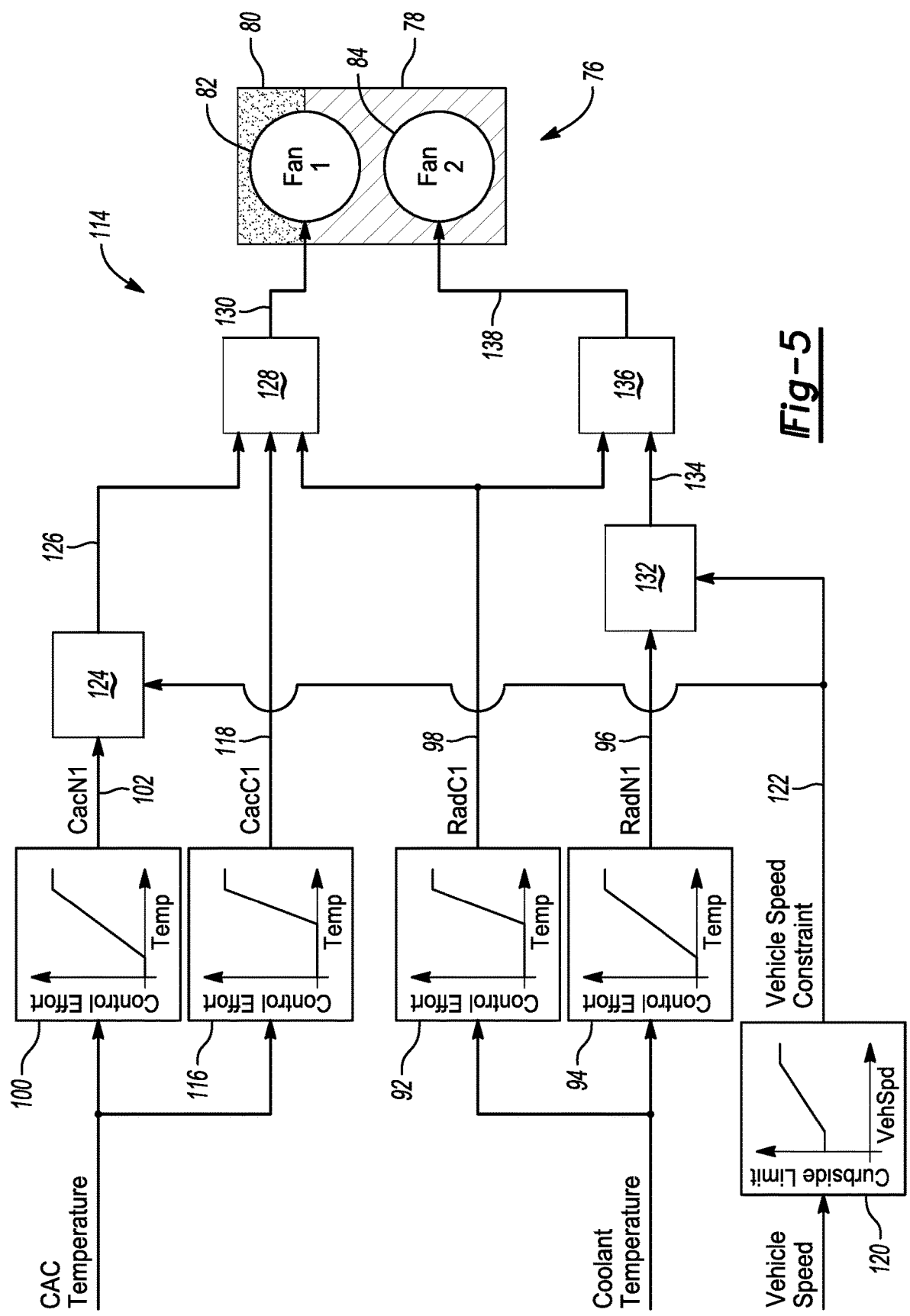
FIG. 5 is a flowchart illustrating a system and method for cooling fan control that includes a vehicle speed constraint in accordance with embodiments described herein.

FIG. 5 shows a flowchart 114 illustrating a control schematic for the first and second fans 82, 84 that includes a number of the control blocks shown and described in conjunction with FIG. 2. In addition to the control blocks used previously, the control strategy illustrated in FIG. 5 uses a vehicle speed constraint to add additional controls to the fan operation strategy. In general, the first control strategy is modified to control output of the first fan 82 based at least in part on a second charge air temperature curve that has lower fan speeds than the first charge air temperature curve for the same respective temperatures over at least a portion of the second charge air temperature curve. More specifically, a control block 116 provides an output signal 118 labeled as "CacC1", which is based on the second charge air cooling temperature curve 108 shown in FIG. 4.

As described above, the graph 104 correlates temperature values of the charge air temperature shown along the x-axis with fan outputs shown along the y-axis. As shown in FIG. 4, at least some of the fan outputs defined by the curve 106 are higher than the fan outputs defined by the curve 108 at the same respective temperature values for the charge air temperature. Only at the highest temperatures and fan output do the two curves 106, 108 coincide. The additional charge air cooler control block 116 is introduced in the strategy illustrated in FIG. 5 to accommodate a quiet mode of operation such as may be desired at low vehicle speeds, as described above. As shown in FIG. 5, a vehicle speed is input into a vehicle speed control block 120 and a vehicle speed constraint signal 122 is output. In general, the control block 120 will determine whether the vehicle speed input is below a predetermined vehicle speed. In the case of a large vehicle such as a bus, this may be a speed in the range of 10 kilometers per hour (kph).

In at least some embodiments of systems and methods described herein, the vehicle speed constraint may set a fan output limit that is known to provide a reasonably quiet operation. For example, the fan outputs illustrated in the graphs 86, 104 in FIGS. 3 and 4 generally operate between a level 1 and a level 12. In at least some cases, a level 5 may be chosen as a maximum fan output to achieve a desired quiet operating mode. As shown in the flowchart 114 in FIG. 5, this vehicle speed constraint 122 is input into a comparator 124, which also receives as an input the signal 102 that is output from the control block 100. In at least some embodiments, the comparator 124 may be an arbitrator that uses the minimum of the two values to provide an output 126 to another comparator 128. Thus, if the control signal 102 called for a level of fan operation above level 5, the output would be clipped at level 5 and the control signal 126 configured accordingly.

The comparator 128 receives the signals 98, 118 and 126 and arbitrates them according to a predetermined instruction set. In general, this may be a maximum arbitrator—i.e. the comparator 128 may provide as an output signal 130 the maximum fan operation level indicated by the three input signals 98, 118, 126. In this situation, the first fan 82 may be controlled according to the highest of the first set of fan outputs, indicated by the control signal 98; the third set of fan outputs, limited by a function of the speed of the vehicle indicated by the control signal 126; and the fourth set of fan outputs, indicated by the control signal 118. In other embodiments, the comparator 128 may use a different arbitration strategy as desired for the particular cooling system. As described above, the control signal 98 is included in the arbitration for the control of the first fan 82 because at least a part of the first fan 82 provides air over the radiator 78. With regard to the two charge air control signals 118, 126, the graph 104 provides additional information as to how these two control curves work together.

Assuming that the fans are being operated according to the quiet mode strategy and in general are limited to a level 5, the control signal 102 will be the same as the control signal 126 for all fan operating levels up to and including level 5. Once the curve 106 indicates that the control signal 102 should go beyond level 5, the vehicle speed constraint signal 122 provides a limit and the control signal 126 remains at level 5. Because it is possible that a vehicle at low operating speeds, or even idling, may need a higher level of cooling than would be provided by operating the first fan 82 at level 5, the system and method illustrated in FIG. 5 allows the first fan 82 to be operated at a higher level once the charge air temperature reaches a predetermined temperature. Specifically, the charge air control will allow the first fan 82 to be operated no higher than level 5 unless the temperature of the charge air reaches 63 C, in which case, the charge air control is transferred to the second charge air curve 108 and the first fan 82 is allowed to operate at level 7. As the charge air temperature increases, the first fan 82 is allowed to operate at higher levels based on the second charge air curve 108. It is worth noting that this discussion of the arbitration between the two charge air cooling curves did not include the control based on the control signal 98; however, as described in detail above, the embodiment illustrated in FIG. 5 actually includes an arbitration of all three signals at the comparator 128.

Just like the control of the first fan 82 may be limited by vehicle speed to provide a quiet mode of operation, the second fan 84 may also be limited in the quiet mode. As shown in FIG. 5, the vehicle speed constraint signal 122 is also provided as an input into a comparator 132. The comparator 132 also receives the control signal 96, which is based on engine coolant as described above. Similar to the comparator 124, the comparator 132 may provide for the minimum value of the two inputs to be output into a control signal 134, which is then used as an input into another comparator 136. The comparator 136 receives not only the signal 134, but also the control signal 98 described above as being based on engine coolant temperature and following the temperature curve 88 shown in FIG. 3. The control signal 98 is provided to the arbitration 128 of the first fan 82 to help to ensure that the engine coolant receives adequate cooling—e.g., if the first fan 82 is operated solely based on charge air temperature, the first fan 82 may be operated at a speed that may lead to the engine coolant being undercooled. The control signal 98 is provided to the arbitration 136 of the second fan 84 to also help ensure that the engine coolant receives adequate cooling, but here the potential under-operation of the second fan 84 is because of the vehicle speed constraint.

An operating strategy for the engine coolant curves 88, 90 that is similar to the operating strategy for the charge air curves 106, 108 is used when the quiet mode operation is in effect. More specifically, when the control signal 96 calls for the second fan 84 to be operated at a level at or below level 5, the control signal 96 will be the same as the control signal 134. When the control signal 96 calls for the second fan 84 to be operated at a level above level 5, the signal will be clipped and the control signal 134 will remain at level 5. As noted above, this could lead to an undesirably hot operation for the vehicle and therefore, the control signal 98 is also used in the comparator 136 to ensure adequate cooling for the engine coolant.

As shown on the graph 86 in FIG. 3, the second fan 84 will be operated at a maximum of level 5 until the coolant temperature reaches the predetermined temperature of 100 C; after which time, the second fan 84 is allowed to operate at level 8, and thereafter follows the control curve 88 as engine coolant temperatures increase. The arbitrator 136 then outputs the maximum of the two control signals 98, 134 into a final control signal 138, which is used to operate the second fan 84. In general, the second control strategy, which is used to control operation of the second fan 84, is further configured beyond the control strategy illustrated in FIG. 2 to limit the output of the second fan 84 when the speed of the vehicle is below the predetermined speed and the engine coolant temperature is below the predetermined engine coolant temperature.

Figure 6:
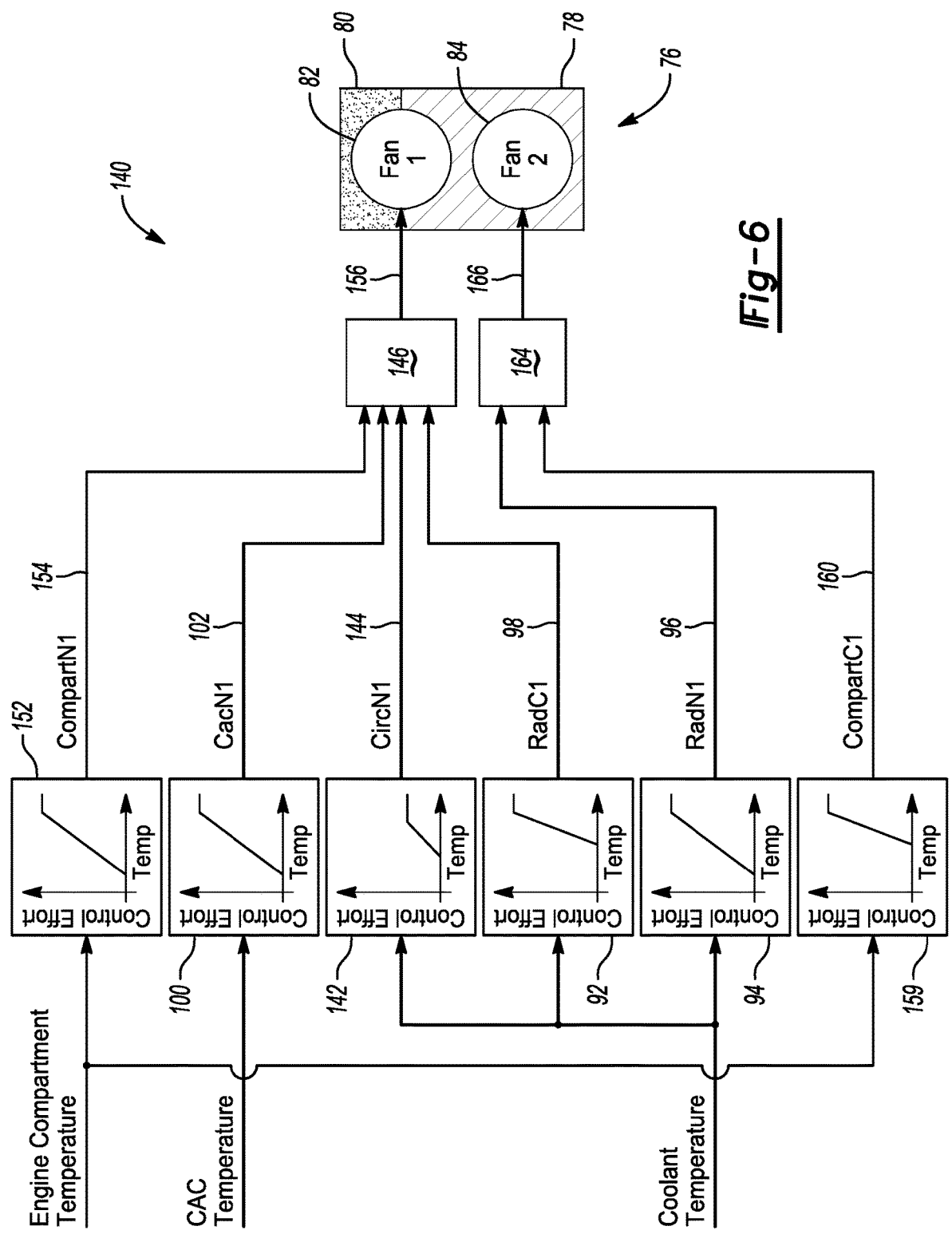
FIG. 6 is a flowchart illustrating a system and method for cooling fan control that includes thermal management of an engine compartment in accordance with embodiments described herein.

In addition to using temperature parameters such as engine coolant temperature and the charge air temperature, systems and methods associated with embodiments described herein may also use other temperature parameters, such as a temperature of an engine compartment. This temperature may be determined by any convenient method; however, a dedicated temperature sensor may be placed within the engine compartment to provide a direct reading to a control system, such as the control system 14. FIG. 6 shows a flowchart 140 illustrating a control strategy in accordance with systems and methods described herein that uses temperature values associated with the engine coolant temperature, the charge air temperature, and the engine compartment temperature. Some of the control blocks are the same as previously described and illustrated above in conjunction with FIGS. 2 and 5. In the embodiment shown in FIG. 6, however, there are additional control blocks, two of which rely on the engine compartment temperature as an input, and one of which relies on the engine coolant temperature, but for a reason other than cooling the engine coolant.

Figure 7:
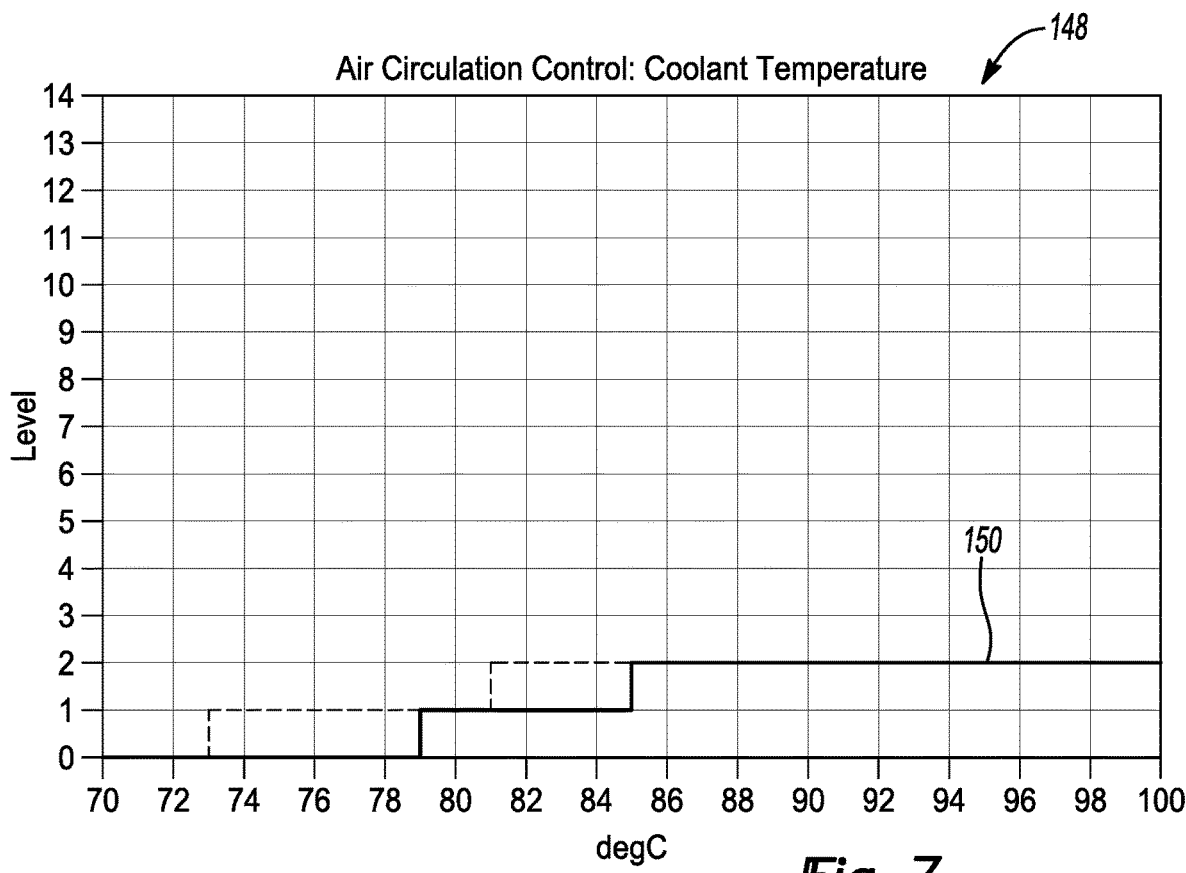
FIG. 7 is a graph illustrating a relationship between coolant temperature and fan output for engine compartment air circulation.

As shown in FIG. 6, operation of the first fan 82 is based at least in part on a control strategy determined at control block 142, which uses the engine coolant temperature as an input. A control signal 144, labeled "CircN1", is output to a comparator 146. The control block 142 determines the control signal 144 based on a relationship between the first temperature values—i.e., temperature values of the engine coolant—correlated to a fifth set of fan outputs. This is illustrated in the graph 148 shown in FIG. 7. The graph 148 includes a curve 150 that provides a level of fan operation based on a desire to circulate air through an engine compartment, such as the engine compartment 72 shown in FIG. 1. Similar to the other graphs illustrated and described above, the unlabeled dotted line associated with the curve 150 represent a hysteresis for control of the fans as the engine coolant temperature drops.

As readily seen by a comparison between the graph 148 and the graph 86 shown in FIG. 3, the temperature values along the x-axis are generally lower for the engine compartment circulation control than they are for the engine coolant temperature control. Moreover, for many of the temperature values, the fan outputs for the engine compartment circulation control are lower than the fan outputs at the same respective temperature values as compared to the outputs indicated by the curves 88, 90 in the graph 86. This is because the goal of the air circulation control is not to cool a heat-producing system, but rather to move air to prevent stagnation and potential hot-spots. In addition, as shown in the graph 148, the fans are not used to circulate air through the engine compartment until the coolant temperature is at least 79 C. This is because, at cold ambient temperatures it may be beneficial to allow the engine and the other vehicle systems to reach at least a minimum temperature before any fan-based air circulation is used. Thus, the first control strategy, which controls the first fan 82, may also be configured to control the output of the first fan 82 based at least in part on the third engine coolant temperature curve 150.

Returning to FIG. 6, the flowchart 140 shows that the first fan 82 is also controlled at least in part based on engine compartment temperature, as indicated by control block 152. The control block 152 outputs a control signal 154, labeled "CompartN1", based on a relationship between the third temperature values—i.e., temperature values of the engine compartment—correlated to a sixth set of fan outputs. This is illustrated in the graph 156 shown in FIG. 8. The graph 156 includes a curve 158 that is part of the first control strategy and controls output of the first fan 82 based at least in part on the first engine compartment temperature curve 158. Unlike the circulation control indicated by control block 142—which was also related to thermal management of an engine compartment—the engine compartment temperature control may be used when it is desired to ensure that the engine compartment does not overheat. The first fan 82 may be particularly helpful to reach this goal, because the charge air cooler 80 will often have much cooler exit air than the radiator 78. This means that air blown into the engine compartment by the first fan 82 will likely be cooler than air blown into the engine compartment by the second fan 84, which is only blowing air through the radiator 78.

Each of the control signals 154, 102, 144, 98 are input into the comparator 146, which decides an appropriate output 156 used to control the first fan 82. In the embodiment shown in FIG. 6, the comparator 146 executes an arbitration and allows the maximum value of the inputs to pass through to the control signal 156. In other embodiments, however, a comparator, such as the comparator 146, may use a different arbitration scheme to combine the control signals that are used as inputs, and may provide as an output some combined effort determined by the inputs. As shown in FIG. 6, the second fan 84 is also controlled at least in part by a relationship between engine compartment temperature and fan output.

Figure 8:
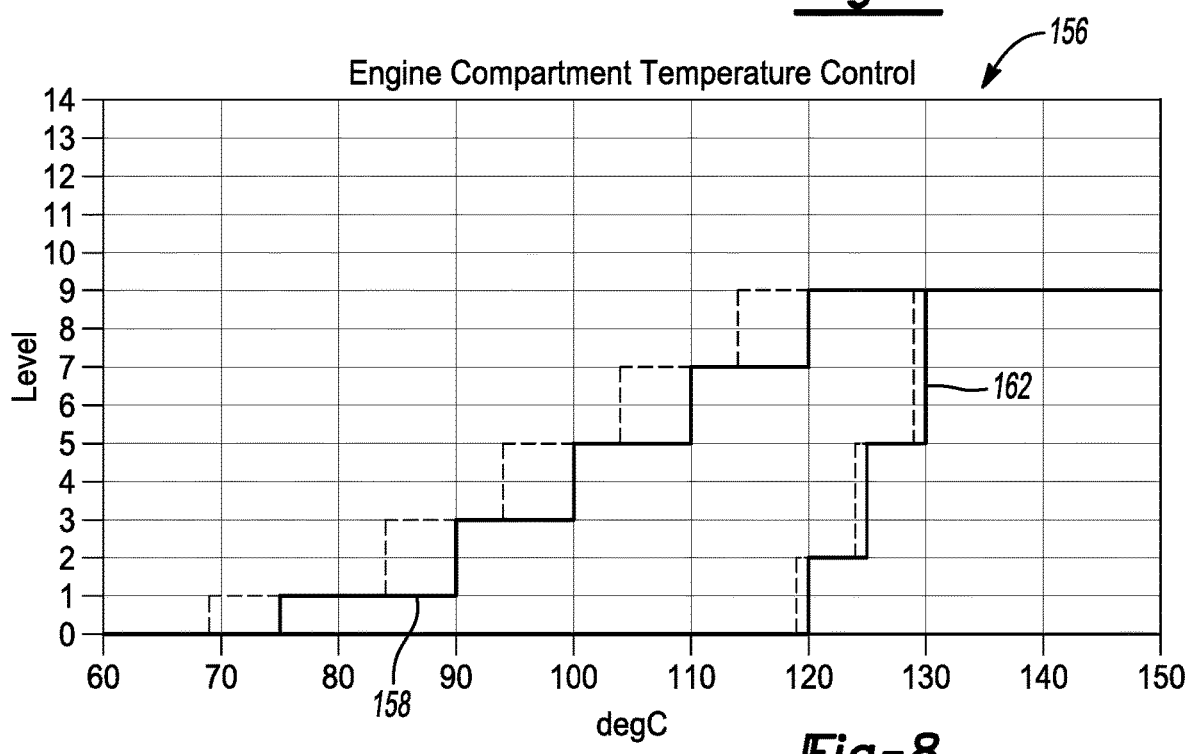
FIG. 8 is a graph illustrating a relationship between engine compartment temperature and fan output for two different operating curves for thermal management of an engine compartment.

More specifically, the engine compartment temperature is used as an input to control block 159. The control block 159 outputs a control signal 160, labeled "CompartC1", based on a relationship between the third temperature values—i.e., temperature values of the engine compartment—correlated to a seventh set of fan outputs. This is illustrated in the graph 156 shown in FIG. 8. The graph 156 includes a second engine compartment temperature curve 162 that is part of the second control strategy and controls output of the second fan 84 based at least in part on the second engine compartment temperature curve 162. As shown in FIG. 8, the fan outputs indicated by the first engine compartment temperature curve 158 are generally higher than the fan outputs indicated by the second engine compartment temperature curve 162 for the same respective temperatures. Only at the highest and lowest temperatures are the curves coincident. The reason for this is that the second fan 84 blows air exclusively through the radiator 78, and is likely to be moving air that is much hotter than the air being moved by the first fan 82. Thus, the second fan 84 is not operated to cool the engine compartment until the temperature of the engine compartment is very hot—for example, 120 C in the embodiment shown in FIG. 8.

The control signals 96, 160 are both used as inputs into a comparator 164, which arbitrates the control signals to provide a final output signal 166 to the second fan 84. In the embodiment shown in FIG. 6, the comparator 164 executes an arbitration and allows the maximum value of the inputs to pass through to the control signal 166. In other embodiments, however, a comparator, such as the comparator 164, may use a different arbitration scheme to combine the control signals that are used as inputs, and may provide as an output some combined effort determined by the inputs. In addition, the configuration shown in FIG. 6, which includes the air circulation control and the engine compartment temperature control, may also have vehicle speed constraints applied, similar to the speed constraints illustrated and described in conjunction with FIG. 5.

As described above, systems and methods in accordance with embodiments described herein contemplate the use of more than just two fans as used in some of the previous examples. FIG. 1 shows a fan and heat exchanger arrangement 18 that includes a split heat exchanger arrangement 20 similar to the configuration of the heat exchanger arrangement 76 illustrated and described in conjunction with FIGS.

Figure 9:
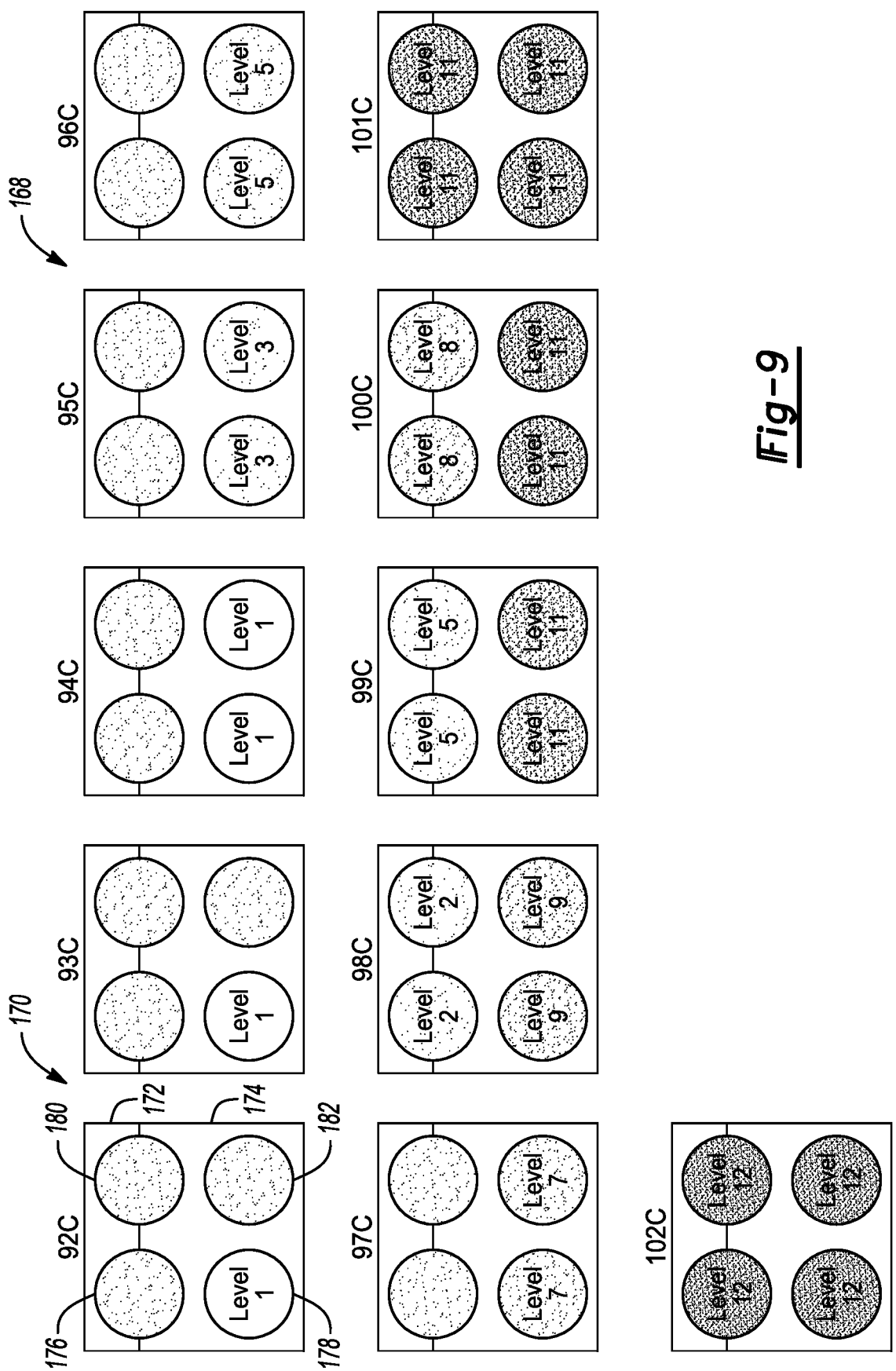
FIG. 9 shows a fan operation pattern for the fans illustrated in FIG. 1 at certain vehicle speeds.
Figure 10:
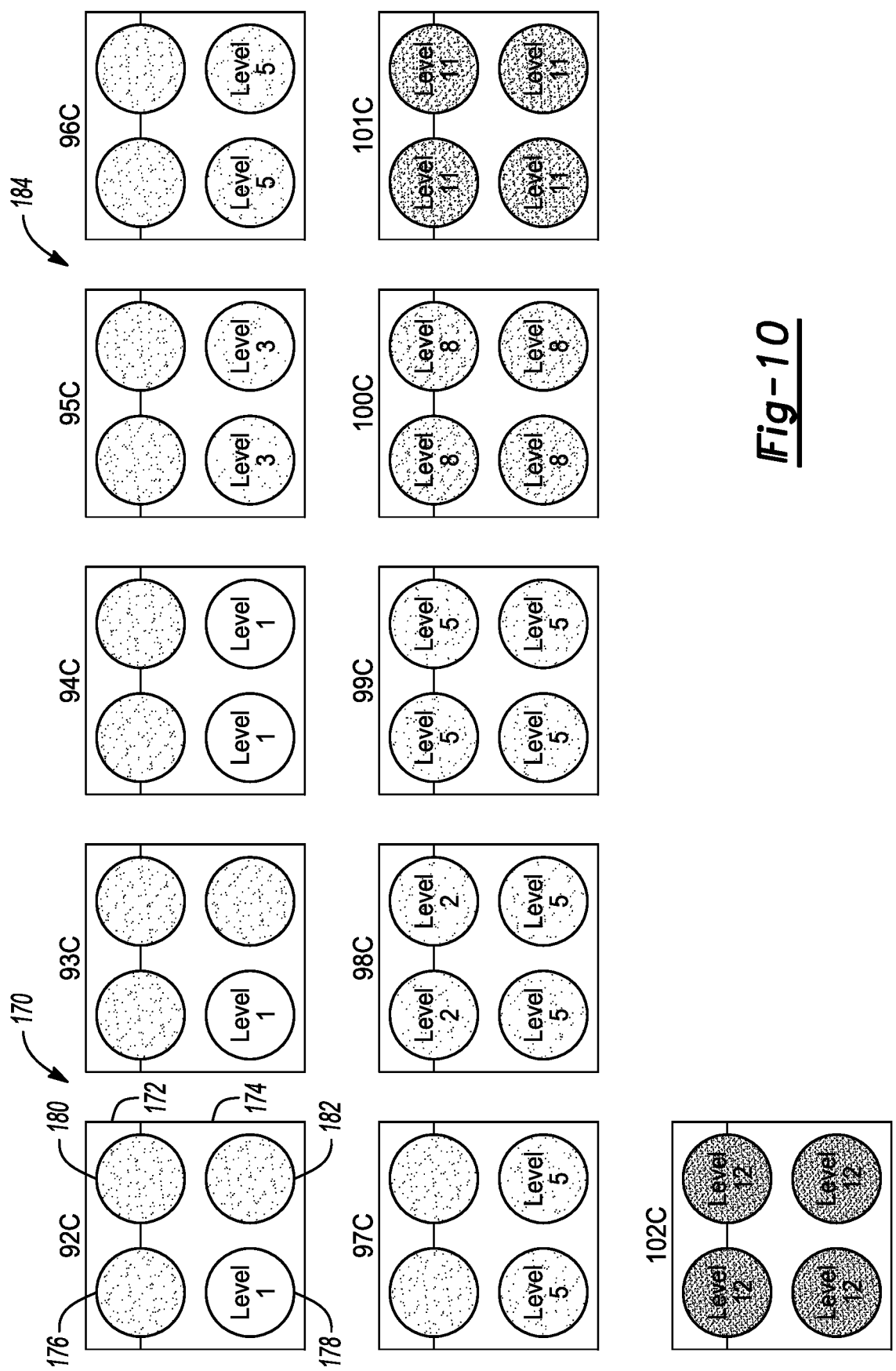
FIG. 10 shows a fan operation pattern for the fans illustrated in FIG. 1 at low vehicle speeds or idle.

2, 5 and 6. One notable difference with of the fan and heat exchanger arrangement 18 is that it includes four fans 22, 24, 26, 28 rather than just the two fans 82, 84. Even so, it is a similarly configured to the heat exchanger arrangement 76 with the first and second fans 82, 84 because two of the fans 22, 24 are shared between the charge air cooler 30 and the radiator 32, while the other two fans 26, 28 are dedicated exclusively to the radiator 32. FIGS. 9 and 10 show examples of how a control system such as illustrated in FIG. 2 may be expanded from two fans to four fans.

FIG. 9 shows a graph 168 having a heat exchanger arrangement 170 with two separated cooling loops, one for a charge air cooler 172 and one for a radiator 174. The heat exchanger arrangement 170 is cooled by a first fan 176, which is shared between the charge air cooler 172 and the radiator 174. The heat exchanger arrangement 170 is also cooled by a second fan 178, which is a dedicated fan servicing radiator 174 only. The heat exchanger arrangement 170 is also cooled by another shared fan 180 and another dedicated fan 182. This fan and heat exchanger arrangement is shown as it may be operated in accordance with embodiments described herein at a number of different engine coolant temperatures. This example generally follows the flowchart 74 illustrated in FIG. 2, but it is limited to control based on engine coolant temperature. It will be apparent to one skilled in the art that similar fan operation can be modeled adding charge air temperature and engine compartment temperature, etc. through the use of superposition, for example, to achieve the desired fan level.

As described above, the control signal 96 is based on the engine coolant temperature curve 90, and the control signal 98 is based on the engine coolant temperature curve 88, both shown in FIG. 3. The operation of the fans 176, 178 in FIG. 9 follows the two curves shown in FIG. 3; however, with the addition of the other two fans 180, 182, there are some differences such as a staggered-start feature. For example, only the dedicated fan 178 is operated at lower temperatures 92 C and 93 C, while the second dedicated fan 182 is not operated until 94 C. One way to implement this staggered-start strategy is to use a control signal such as the control signal 96 to operate the fan 178, but then to use a second control signal to operate the fan 182. The second control signal may be identical to the control signal 96, but with one exception: it delays fan operation until 94 C. The second control signal may be based on an alternate engine coolant temperature curve similar to the curve 90 shown in FIG. 3. The difference between the alternate curve and the curve 90 is that the curve 90 indicates a desired fan operation of level 1 when the coolant temperature is 92; conversely, the alternate curve does not indicate a desired fan operation of level 1 until 94 C. When the coolant temperature reaches 94 C, the control signal 96 and the second control signal control the fans 178, 182 the same—i.e., the engine coolant temperature curve 90 is coincident with the alternate curve for coolant temperatures of 94 C and higher. Thus, the control systems illustrated and described above may be applied to each dedicated fan individually using control signals that are exactly the same, or alternatively by using control signals that are almost the same, but delay operation of one or more of the dedicated fans. The same is true for shared fans—e.g., the shared fans 176, 180—which may be controlled by control signals that are exactly the same or ones that are almost the same, but delay operation of one or more of the shared fans.

As shown in FIG. 9, operation of the two dedicated fans 178, 182 continues with no output from the shared fans 176, 180 until a temperature of the coolant reaches 98 C. As shown by the curve 88 in FIG. 3, it is at this temperature that the shared fans—see control signal 98 in FIG. 2—are first operated. In this example, the shared fans 176, 180 are shown to operate exactly the same, but as described above they could have been controlled to operate almost the same except that operation of one of the shared fans could have been delayed. Each of the shared fans 176, 180 follow the curve 88, and the dedicated fans 178, 182 respectively follow the curve 90 and the alternate curve—which are coincident at these temperatures. The shared fans 176, 180 are operated at different levels than the dedicated fans 178, 182 until a temperature of the coolant gets very high, in this example 101 C. After 101 C, the fans operate at the same levels, and this is indicated by the curves 88, 90 which are coincident after 101 C.

FIG. 10 shows a graph 184 that uses the same heat exchanger arrangement 170, but the control is implemented in accordance with the vehicle speed constraint mode of operation, generally shown in the flowchart 114 in FIG. 5. The control of the fans in FIG. 10 is also limited to control based on engine coolant temperature only. The graph 184 shows that there is no difference in fan operation compared to the graph 168 through a temperature of 96 C. After this temperature, however, operation of the dedicated fans 178, 182—see the control signal 96 in FIG. 5—are clipped to a level 5 by the vehicle speed constraint 122. As described above in conjunction with FIG. 5, the vehicle speed constraint will continue until the temperature reaches the predetermined temperature of 100 C, at which point all of the fans 176, 178, 180, 182 will follow the curve 88 and output cooling at levels necessary to ensure that the engine coolant temperature does not get too high.

FIGS. 11 and 12 show other fan and heat exchanger arrangements that may be used in accordance with systems and methods described herein. For example, FIG. 11 shows a heat exchanger arrangement 186 that has three adjacent heat exchangers: a charge air cooler 188, a transmission cooler 190, and a radiator 192. The three heat exchangers 188, 190, 192 all serve separate cooling loops, wherein the cooling fluid is not combined with any cooling fluid associated with the other cooling loops. In the embodiment shown in FIG. 11, fans 194, 196, 198 are shared fans between the charge air cooler 188 and the transmission cooler 190. Similarly, the fans 200, 202, 204 are shared between the transmission cooler 190 and the radiator 192. Finally, fans 206, 208, 210 are dedicated fans, and serve only the radiator 192. Because the different cooling loops associated with the heat exchanger arrangement 186 will likely have different cooling needs, it may be beneficial to control the fans in accordance with embodiments of systems and methods described above.

FIG. 12A shows a front view of a heat exchanger arrangement 212, having several heat exchangers configured in a front-to-back arrangement. As shown in the top view of FIG. 12B, the heat exchanger arrangement 212 includes an air conditioning condenser 214, a charge air cooler 216, and a radiator 218. Providing cooling to the heat exchanger arrangement 212 are five fans 220, 222, 224, 226, 228. As clearly shown in the side view of FIG. 12C, the fans 220, 222, 224 provide cooling to all three of the heat exchangers 214, 216, 218. In contrast, the fans 226, 228 provide cooling only to the radiator 218. Because the heat exchanger arrangement 212 includes an air conditioning condenser 214, it may be desirable to control operation of the fans 220, 222, 224 in accordance with parameters other than the temperature parameters described above. For example, a pressure in the air conditioning system may be used as an indicator of when additional cooling may be needed. Although the heat exchangers 214, 216, 218 are arranged in a front-to-back configuration, they are served by separate cooling loops, and it may be beneficial to control the fans 220-228 in accordance with embodiments of systems and methods described herein to provide an appropriate level of cooling for each of the respective cooling loops.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A thermal management system for a vehicle, comprising:
    first and second fans connectable to a heat exchanger arrangement having a plurality of separated cooling loops therein such that the first fan is operable to move air through at least two of the cooling loops, and the second fan is operable to move air through at least one of the cooling loops, the at least one of the cooling loops being different from the at least two of the cooling loops, the heat exchanger arrangement being connectable to a heat-producing system of the vehicle, and the heat exchanger arrangement and the fans forming a part of a cooling system for the heat-producing system; and
    a control system including at least one controller and operable to control the fans, the control system being configured to control the first fan at least in part according to temperature values correlated with a first set of fan outputs, and to control the second fan at least in part according to the temperature values correlated with a second set of fan outputs, at least some of the second set of fan outputs being higher than the first set of fan outputs at the same respective temperature values, the temperature values correlated with the first set of fan outputs and the temperature values correlated with the second set of fan outputs being based on a temperature parameter that is the same for both fans.

2. The thermal management system of claim 1, wherein the control system is further configured to control the second fan at least in part according to the temperature values correlated with the first set of fan outputs when a speed of the vehicle is below a predetermined speed.

3. The thermal management system of claim 2, wherein the control system is further configured to control the second fan according to the temperature values correlated with the first set of fan outputs when the speed of the vehicle is below the predetermined speed and a temperature of the temperature parameter is above a predetermined temperature.

4. The thermal management system of claim 1, wherein the temperature parameter is a first temperature parameter and the temperature values are first temperature values, and the control system is further configured to control the first fan at least in part according to second temperature values correlated with a third set of fan outputs, the second temperature values being based on a second temperature parameter indicative of one of a temperature of a heat-producing system or a temperature of a cooling system and being different from the first temperature parameter.

5. The thermal management system of claim 4, wherein the control system is further configured to control the first fan at least in part according to the second temperature values correlated with a fourth set of fan outputs when a speed of the vehicle is below a predetermined speed, at least some of the third set of fan outputs being higher than the fourth set of fan outputs at the same respective second temperature values.

6. The thermal management system of claim 5, wherein the control system is further configured to control the first fan according to the highest of the first set of fan outputs, the third set of fan outputs limited by a function of a speed of the vehicle, and the fourth set of fan outputs when the speed of the vehicle is below the predetermined speed.

7. The thermal management system of claim 4, wherein the control system is further configured to control the first fan at least in part according to the first temperature values correlated to a fifth set of fan outputs, at least some of the fifth fan outputs being lower than the first set of fan outputs and the second set of fan outputs at the same respective first temperature values.

8. The thermal management system of claim 4, wherein the control system is further configured to control the first fan at least in part according to third temperature values correlated with a sixth set of fan outputs, the third temperature values being based on a third temperature parameter indicative of one of a temperature of the heat-producing system or a temperature of the cooling system and being different from the first temperature parameter and the second temperature parameter.

9. The thermal management system of claim 8, wherein the control system is further configured to control the second fan at least in part according to the third temperature values correlated with a seventh set of fan outputs, at least some of the sixth set of fan outputs being higher than the seventh set of an outputs at the same respective third temperature values.

10. The thermal management system of claim 9, wherein the control system is further configured to control the first fan at least in part according to the third temperature values correlated with the seventh set of fan outputs when a speed of the vehicle is below a predetermined speed.

11. The thermal management system of claim 8, wherein the first temperature parameter is coolant temperature in an engine coolant cooling loop of the heat exchanger arrangement, the second parameter is charge air temperature in a charge air cooling loop of the heat exchanger arrangement, and the third temperature parameter is engine compartment temperature in the vehicle.

12. The thermal management system of claim 8, wherein at least one of the first second or third temperature parameters is transmission sump temperature or transmission retarder temperature.

13. The thermal management system of claim 1, wherein the control system is further configured to control at least on of the first fan or the second fan at least in part according to a pressure of an air conditioning system of the vehicle.

14. A thermal management system for a vehicle, comprising:
    a plurality of fans connectable to a heat exchanger arrangement having a plurality of separated cooling loops therein such that at least one fan of the fans is operable to move air through at least two of the cooling loops, and at least one other fan of the fans is operable to move air through at least one of the cooling loops, the at least one of the cooling loops being different from the at least two of the cooling loops, the heat exchanger arrangement being connectable to a heat-producing system of the vehicle, and the heat exchanger arrangement and the fans forming a part of a cooling system for the heat-producing system; and a control system including at least one controller and operable to control each of the at least one fan using a respective control strategy correlating temperature values of a temperature parameter with fan outputs, and to control each of the at least one other fan using a respective control strategy correlating temperature values of the temperature parameter with different fan outputs.

15. The thermal management system of claim 14, wherein the at least one fan includes a first fan operable to move air through an engine coolant loop of the heat exchanger arrangement and through at least one other of the cooling loops of the heat exchanger arrangement, and the at least one other fan includes a second fan operable to move air through the engine coolant loop of the heat exchanger arrangement, the control system being configured to control the first fan using a first control strategy and to control the second fan using a second control strategy, the first control strategy being configured to control an output of the first fan based at least in part on a first engine coolant temperature curve, and the second control strategy being configured to control an output of the second fan based at least in part on a second engine coolant temperature curve having higher fan speeds than the first engine coolant temperature curve for the same respective temperatures over at least a portion of the second engine coolant temperature curve.

16. The thermal management system of claim 15, wherein the first control strategy is further configured to control the output of the first fan based at least in part on a first charge air temperature curve.

17. The thermal management system of claim 16, wherein the first control strategy is further configured to limit the output of the first fan when a speed of the vehicle is below a predetermined speed and a charge air temperature is below a predetermined charge air temperature, and the second control strategy is further configured to limit the output of the second fan when the speed of the vehicle is below the predetermined speed and an engine coolant temperature is below a predetermined engine coolant temperature.

18. The thermal management system of claim 17, wherein the first control strategy is further configured to control the output of the first fan based at least in part on a second charge air temperature curve having lower fan speeds than the first charge air temperature curve for the same respective temperatures over at least a portion of the second charge air temperature curve.

19. The thermal management system of claim 15, wherein the first control strategy is further configured to control the output of the first fan based at least in part on a third engine coolant temperature curve having lower fan speeds than the first engine coolant temperature curve for the same respective temperatures over at least a portion of the third engine coolant temperature curve.

20. The thermal management system of claim 19, wherein the first control strategy is further configured to control the output of the first fan based at least in part on a first engine compartment temperature curve, and the second control strategy is further configured to control the output of the second fan based at least in part on a second engine compartment temperature curve having lower fan speeds than the first engine compartment temperature curve for the same respective temperatures over at least a portion of the second engine compartment temperature curve.

21. The thermal management system of claim 2, wherein the control system is configured to control the second fan at least in part according to the temperature values correlated with the first set of fan outputs to reduce a speed of the second fan when a speed of the vehicle is below a predetermined speed.

22. The thermal management system of claim 1, wherein the control system is further configured to reduce the speed of the second fan at least in part according to the temperature values correlated with the first set of fan outputs when a speed of the vehicle is below a predetermined speed.

\* \* \* \* \*

UNITED STATES PATENT AND TRADEMARK OFFICE
CERTIFICATE OF CORRECTION

PATENT NO. : 10,596,879 B2  
APPLICATION NO. : 15/235618  
DATED : March 24, 2020  
INVENTOR(S) : Todd M. Steinmetz et al.

Page 1 of 1

It is certified that error appears in the above-identified patent and that said Letters Patent is hereby corrected as shown below:

In the Claims

Column 16, Lines 33-34, Claim 9:  
After "higher than the seventh set of"  
Delete "an" and  
Insert --fan--

Column 16, Line 53, Claim 13:  
After "configured to control at least"  
Delete "on" and  
Insert --one--

Signed and Sealed this  
Twentieth Day of October, 2020

Andrei Iancu  
*Director of the United States Patent and Trademark Office*